(12) United States Patent
Maddocks et al.

(10) Patent No.: US 10,102,523 B2
(45) Date of Patent: *Oct. 16, 2018

(54) MOBILE SECURE ELEMENT BASED SHARED CARDHOLDER VERIFICATION

(71) Applicant: MasterCard International Incorporated, Purchase, NY (US)

(72) Inventors: Ian David Alan Maddocks, Milton Keynes (GB); Simon Phillips, York (GB); Jonathan James Main, Hampshire (GB)

(73) Assignee: Mastercard International Incorporated, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/606,252

(22) Filed: May 26, 2017

(65) Prior Publication Data

US 2017/0262839 A1 Sep. 14, 2017

Related U.S. Application Data

(63) Continuation of application No. 14/162,055, filed on Jan. 23, 2014, now Pat. No. 9,704,156.

(51) Int. Cl.
*G06K 5/00* (2006.01)
*G06Q 20/36* (2012.01)
*G06Q 20/40* (2012.01)
*G06Q 20/32* (2012.01)
*G06Q 20/20* (2012.01)

(52) U.S. Cl.
CPC ......... *G06Q 20/3672* (2013.01); *G06Q 20/20* (2013.01); *G06Q 20/3278* (2013.01); *G06Q 20/36* (2013.01); *G06Q 20/4014* (2013.01); *G06Q 20/40145* (2013.01)

(58) Field of Classification Search
CPC ............... G06Q 20/20; G06Q 20/1085; G06Q 20/3672; G06Q 20/3278; G06Q 20/36; G06Q 20/4014; G06Q 20/40145
USPC .................................. 235/379, 380; 705/44
See application file for complete search history.

(56) References Cited

U.S. PATENT DOCUMENTS 9,704,156 B2 * 7/2017 Maddocks ......... G06Q 20/3672

* cited by examiner

*Primary Examiner* — Karl D Frech
(74) *Attorney, Agent, or Firm* — Buckley, Maschoff & Talwalkar LLC

(57) ABSTRACT

In a payment-enabled smartphone, a shared cardholder verification method (CVM) applet serves a number of mobile payment cardlets. The shared CVM applet validates CVM information input by a user of the smartphone and in response issues a CVM token. The CVM token is passed to a particular one of the mobile payment cardlets that is selected for a current transaction. The selected mobile payment cardlet submits the CVM token back to the shared CVM applet for verification. Upon verifying the CVM token, the shared CVM applet enables the selected mobile payment cardlet to perform the current transaction.

20 Claims, 6 Drawing Sheets

MOBILE SECURE ELEMENT BASED SHARED CARDHOLDER VERIFICATION

CROSS REFERENCE TO RELATED APPLICATION

This application is a continuation of pending U.S. patent application Ser. No. 14/162,055 filed on Jan. 23, 2014 entitled MOBILE SECURE ELEMENT BASED SHARED CARDHOLDER VERIFICATION, the contents of which application are hereby incorporated by reference for all purposes.

BACKGROUND

Payment cards such as credit cards and debit cards are in widespread use. In some environments, payment cards in the form of magnetic stripe cards prevail in terms of popularity. In other environments, it is more common to use so-called "contactless" payment cards. With contactless payment cards, the payment card account number is stored in an integrated circuit (IC) within the card, and is read by short-range radio communication between the card and the contactless reader component of a point of sale (POS) terminal. With enhancements that have occurred to mobile phones, including smartphones, the capability has been added to perform NFC (near field communication) communications to enable so-called "contactless" payment cards to be digitized into these consumer devices. These mobile devices utilize a secure element (SE) to store the payment card account number and associated data, keys and Personal Identification Number (PIN) to enable the consumer to perform a payment transaction using the NFC short-range radio communications provided by the mobile device and the contactless reader component of a POS terminal.

Still other proposals envision storing information for several payment cards in a single smartphone. According to publicly disclosed concepts, a smartphone may be provided with a small "wallet application" to permit the user to select one of a number of payment card account applets (sometimes referred to as "cardlets") for use in a current payment transaction, where each of the cardlets is associated with a different payment card account that belongs to the user of the smartphone and each cardlet incorporates the payment card account number and other information corresponding to the respective payment card account. To provide secure storage and processing the cardlets are stored in an IC (integrated circuit); in mobile NFC environments this IC is known as a Secure Element (SE) provided as part of the GSM mobile SIM card or a discrete SE embedded into the handset known as an embedded SE (eSE), or included on a removable devices such as a memory card.

For many payment transactions, the issuer of the payment card account or another entity mandates "two factor" security—that is, the user must not only present a physical credential (e.g., a payment card or payment-enabled mobile device), but also must provide additional information to verify that the user is the person who is authorized to present the credential. The presentation of additional information is sometimes referred to in the payment card industry as a "cardholder verification method", or "CVM". A widely used CVM calls for the user to enter a "PIN", i.e., a "personal identification number". Often when a payment card (and especially a debit card) is presented to a POS terminal, the user is prompted to enter his/her PIN to satisfy a CVM requirement. There have also been many proposals for CVM requirements involving receipt of biometric information from the user.

It has been widely recognized that the user interface of a smartphone may be the channel by which the user may enter his/her PIN to comply with a CVM requirement. In a case where the smartphone stores several payment cardlets, one possible arrangement may require the user to enter a different PIN depending on which cardlet was selected to be active for the current payment transaction. As a known alternative, a standard shared CVM applet has been proposed to manage PIN entry into the smartphone to satisfy CVM requirements for all of the payment cardlets operable in the payment-enabled smartphone. In this case a single PIN may be used to "unlock" any of the payment cardlets present in the phone. For example, a standard published by "GlobalPlatform" defines a global PIN solution providing a shared CVM service on an integrated circuit card that may be incorporated in a smartphone. However, the present inventors have recognized that there are opportunities to improve upon the degree of flexibility and/or convenience provided by the previously proposed standard CVM smartphone applet.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present invention, a payment-enabled mobile device includes a shared CVM applet stored in a secure element together with a number of payment cardlets that the shared CVM applet serves. The shared CVM applet validates CVM information received from the user of the device. Upon validating the CVM information, the shared CVM applet issues a CVM token. The token is passed from the shared CVM applet to a CVM capture software module through which the CVM information had been received. The CVM capture software module passes the token to a wallet midlet. Via the wallet midlet, the user selects one of the payment cardlets for use in the current payment transaction. The wallet midlet passes the CVM token to the selected payment cardlet, which in turn passes the token to the shared CVM applet. The shared CVM applet verifies that the token it receives from the selected payment cardlet matches the token it had previously issued. Upon doing so, the shared CVM applet provides authority to the selected payment cardlet to present the current payment transaction as a CVM satisfied transaction.

Figure 1:
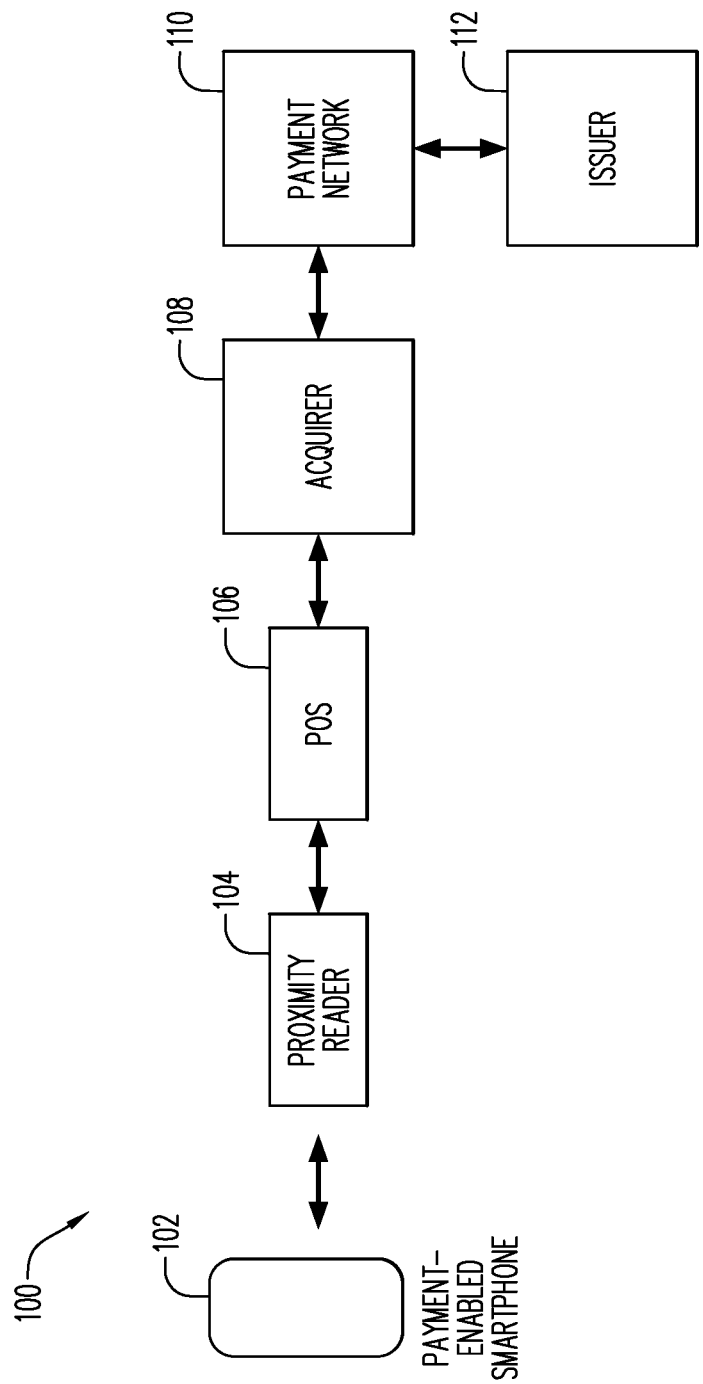
FIG. 1 is a block diagram that illustrates a system in which the present invention may be applied.

FIG. 1 is a block diagram that illustrates a system 100 in which the present invention may be applied. (Although the following discussion relates to a payment environment, as will be understood from other portions of this disclosure, the teachings herein regarding use of shared CVM are applicable to other environments as well, including for example physical location access or any other environment in which a machine-readable credential may be required or desirable.)

The system 100 includes a payment-enabled smartphone 102. The smartphone 102 may be operable as a mobile telephone, while also being able to perform functions of a contactless payment card and also embodying enhanced and flexible CVM functionality as provided in accordance with aspects of the present invention and as described below. Further details of the smartphone 102 are described below in conjunction with FIGS. 2-4.

The system 100 further includes a proximity reader component 104 associated with a POS terminal 106. The proximity reader component 104 and the POS terminal 106 may be substantially or entirely conventional. In some embodiments, both the proximity reader component 104 and the smartphone 102 may include capabilities for NFC communication, so that those two devices may engage in communication with each other in accordance with the NFC standard. In other embodiments, one or more other methods of communication may take place between the smartphone 102 and the proximity reader component 104 instead of or in addition to NFC communication; such communications may result in the mobile device transacting with a reader component 104 through the internet. As is well known, communication between the smartphone 102 and the proximity reader component 104 may be initiated by the user (not shown in FIG. 1) tapping the smartphone 102 on an appropriate location on the housing (not separately shown) of the proximity reader component 104.

The proximity reader component 104 and the POS terminal 106 may be located at the premises of a retail store and operated by a sales associate of the retailer for the purpose of processing retail transactions. The smartphone 102 is shown in FIG. 1 to be interacting with the proximity reader component 104 and the POS terminal 106 for the purpose of executing such a transaction.

A computer 108 operated by an acquirer (acquiring financial institution) is also shown as part of the system 100 in FIG. 1. The acquirer computer 108 may operate in a conventional manner to receive an authorization request for the transaction from the POS terminal 106. The acquirer computer 108 may route the authorization request via a payment network 110 to the server computer 112 operated by the issuer of a payment card account that is available for access by the smartphone 102 and that has been selected for use in the present payment transaction. Also in a conventional manner, the authorization response generated by the payment card issuer server computer 112 may be routed back to the POS terminal 106 via the payment network 110 and the acquirer computer 108.

The payment network 110 may be entirely or substantially conventional; one example of a suitable payment network is the well-known Banknet system operated by MasterCard International Incorporated, which is the assignee hereof.

The payment card issuer server computer 112 may be conventional and may be operated by or on behalf of a financial institution ("FI"; not separately shown) that issues payment card accounts to individual users. For example, the payment card issuer server computer 112 may perform conventional functions, such as (a) receiving and responding to requests for authorization of payment card account transactions to be charged to payment card accounts issued by the FI; and (b) tracking and storing transactions and maintaining account records.

The components of the system 100 as depicted in FIG. 1 are only those that are needed for processing a single transaction. A typical practical embodiment of the system 100 may process many purchase transactions (including simultaneous transactions) and may include a considerable number of payment card issuers and their computers, a considerable number of acquirers and their computers, and numerous merchants and their POS terminals and associated proximity reader components. The system may also include a very large number of payment card account holders, who carry payment-enabled mobile devices (such as the smartphone 102 described herein) and/or payment cards (including contactless payment cards and/or magnetic stripe cards).

It should also be understood that the smartphone 102 is operable as a conventional mobile telephone for communication—both voice and data—over a conventional mobile telecommunications network, which is not depicted in the drawing. Thus, the smartphone 102 may be in communication from time to time in a conventional manner with a mobile network operator ("MNO"—also not shown). An over-the air communication channel (not shown in FIG. 1) between the smartphone 102 and the payment card issuer server computer 112 (or a related computer) may be established from time to time for purposes such as personalization, set up, etc. with respect to the smartphone 102.

Figure 2:
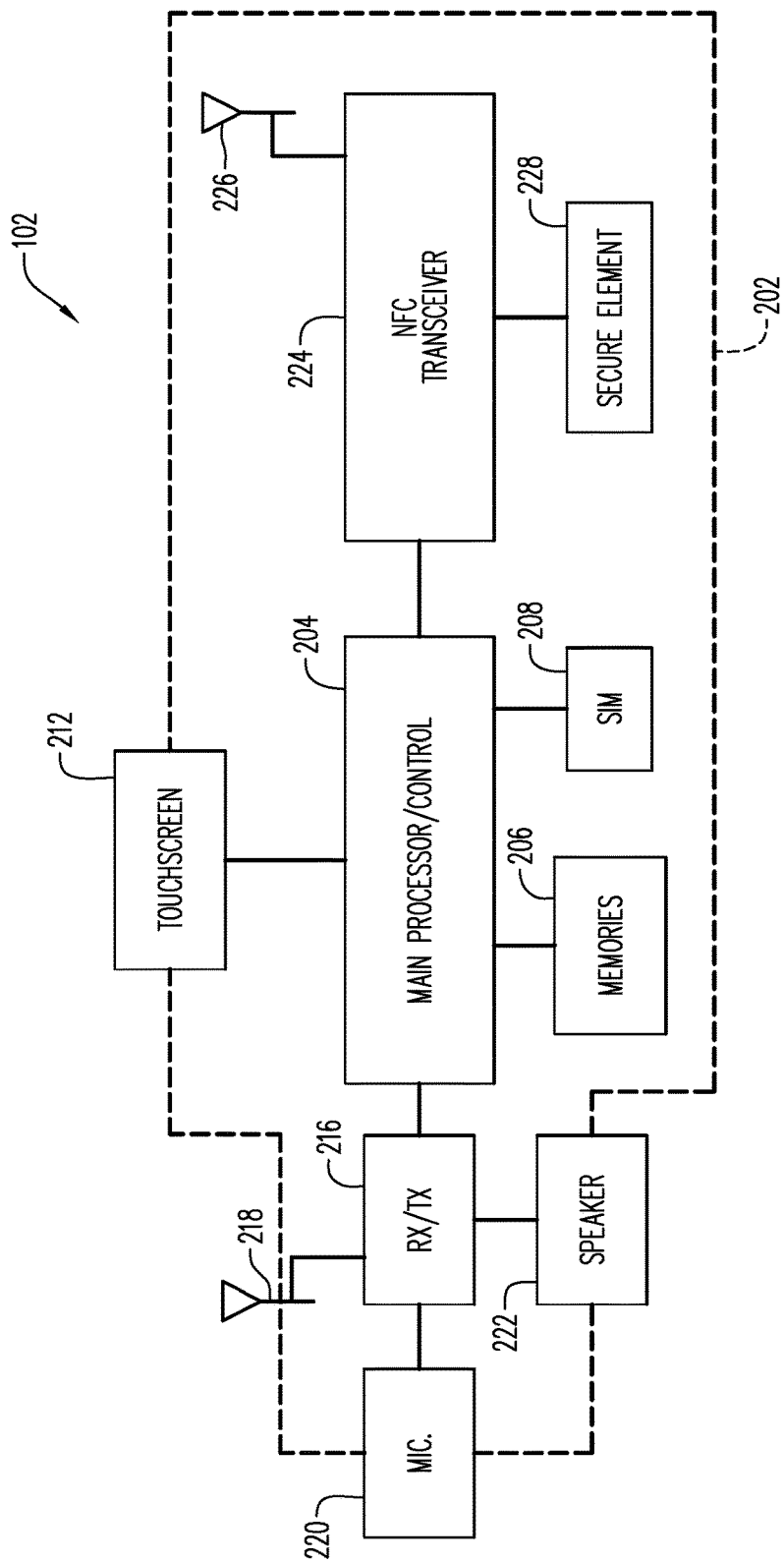
FIG. 2 is a block diagram that illustrates an example embodiment of a payment-enabled smartphone provided in accordance with aspects of the present invention.

FIG. 2 is a block diagram that illustrates an example embodiment of the payment-enabled smartphone 102 shown in FIG. 1 and provided in accordance with aspects of the present invention. The smartphone 102 may be conventional in its hardware aspects. For example, the smartphone 102 may resemble, in most of its hardware aspects and many of its functions, a conventional "iPhone" marketed by Apple Inc., or one of the numerous smartphone models that run the "Android" operating system.

The smartphone 102 may include a conventional housing (indicated by dashed line 202 in FIG. 2) that contains and/or supports the other components of the smartphone 102. The housing 202 may be shaped and sized to be held in a user's hand, and may for example exhibit the type of form factor that is common with the current generation of smartphones.

The smartphone 102 further includes conventional control circuitry 204, for controlling over-all operation of the smartphone 102. For example, the control circuitry 204 may include a conventional processor of the type designed to be the "brains" of a smartphone.

Other components of the smartphone 102, which are in communication with and/or controlled by the control circuitry 204, include: (a) one or more memory devices 206 (e.g., program and working memory, etc.); (b) a conventional SIM (subscriber identification module) card 208; (c) a conventional touchscreen 212 which serves as the primary input/output device for the smartphone 102, and which thus receives input information from the user and displays output information to the user. As is the case with many models of smartphones, in some embodiments the smartphone 102 may also include a few physically-actuatable switches/controls (not shown), such as an on/off/reset switch, a menu button, a "back" button, a volume control switch, etc. It may also be the case that the smartphone includes a conventional digital camera, which is not shown.

The smartphone 102 also includes conventional receive/transmit circuitry 216 that is also in communication with and/or controlled by the control circuitry 204. The receive/transmit circuitry 216 is coupled to an antenna 218 and provides the communication channel(s) by which the smartphone 102 communicates via the mobile telephone communication network (not shown). The receive/transmit circuitry 216 may operate both to receive and transmit voice signals, in addition to performing data communication functions.

The smartphone 102 further includes a conventional microphone 220, coupled to the receive/transmit circuitry 216. Of course, the microphone 220 is for receiving voice input from the user. In addition, a loudspeaker 222 is included to provide sound output to the user, and is coupled to the receive/transmit circuitry 216.

The receive/transmit circuitry 216 may operate in a conventional fashion to transmit, via the antenna 218, voice signals generated by the microphone 220, and to reproduce, via the loudspeaker 222, voice signals received via the antenna 218. The receive/transmit circuitry 216 may also handle transmission and reception of text messages and other data communications via the antenna 218.

The smartphone 102 may also include circuitry 224 that is partly or wholly dedicated to implementing the NFC communications circuitry functionality of the smartphone 102. The smartphone 102 may further include a loop antenna 226, coupled to the NFC circuitry 224. In some embodiments, the NFC circuitry 224 may partially overlap with the control circuitry 204 for the smartphone 102. Moreover, the payment circuitry is associated with, and may also overlap with, a secure element 228 that is part of the smartphone 102 and is contained within the housing 202, or the NFC circuitry could be omitted in embodiments that do not utilize NFC. The term "secure element" is well known to those who are skilled in the art, and typically refers to a device that may include a small processor and volatile and nonvolatile memory (not separately shown) that are secured from tampering and/or reprogramming by suitable measures. Further details relating to the secure element 228, and particularly relating to the programming thereof, will be described below with reference to FIGS. 3 and 4. In some embodiments, the secure element 228 may be provided as part of the SIM card 208. In other embodiments, the secure element 228 may be constituted by an integrated circuit card separate from the SIM card 208 but possibly having the same form factor as the SIM card 208. In some embodiments of the smartphone 102, the secure element 228 may be conventional in its hardware aspects but may be programmed in accordance with aspects of the present invention in a manner to be described below. (It should be noted that the term "secure element" is not intended to be limited to devices that are IC-based, but rather may also include any secure execution environment in a mobile device, and may include software based secure execution environments running on the main mobile device processor.)

Figure 3:
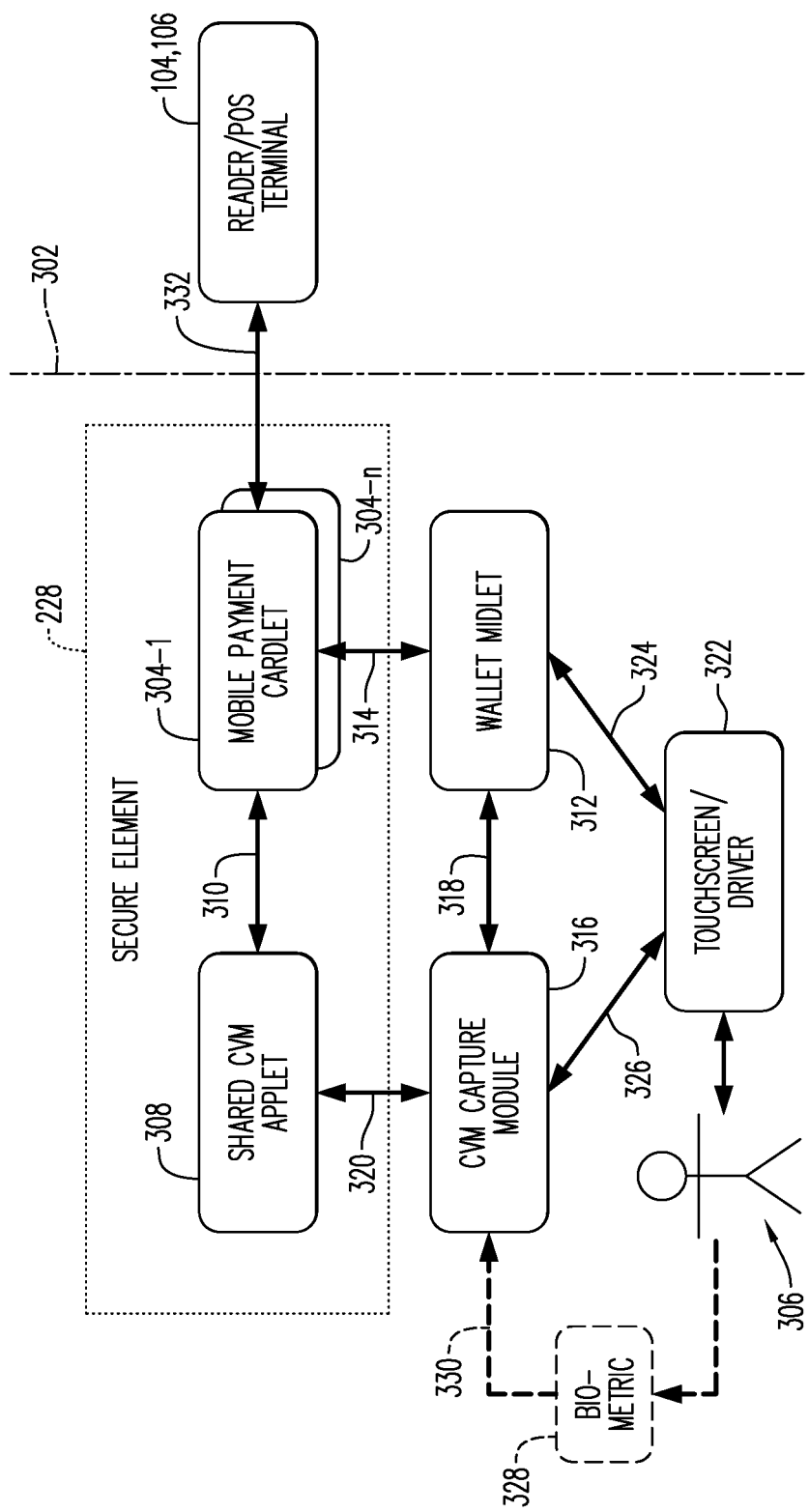
FIG. 3 is an information flow diagram showing functional software blocks provided in the smartphone of FIG. 2 in accordance with aspects of the present invention.

FIG. 3 is an information flow diagram showing functional software blocks provided in the smartphone 102 in accordance with aspects of the present invention. The dotted-line block in FIG. 3 represents the secure element 228 referred to above in FIG. 2 and is labeled accordingly. The dot-dash line 302 shown in FIG. 3 schematically represents the housing 202 of the smartphone 102 in the sense that software and hardware components represented to the left of the dot-dash line 302 are features of the smartphone 102.

In accordance with aspects of the present invention, the secure element 228 has stored therein a plurality of mobile payment cardlets (payment card applications) 304-1 through 304-n. Although only two mobile payment cardlets 304 are explicitly shown in FIG. 3, the number actually present in the secure element 228/smartphone 102 may be greater than two. (Furthermore, alternative secure element applets could utilize the shared CVM support.) As is conventional, each of the mobile payment cardlets 304 may represent a respective payment card account belonging to the user (schematically indicated at 306 in FIG. 3) and may store or have access to the corresponding payment card account number for the payment card account it represents. In many ways the mobile payment cardlets 304 may operate in a conventional manner in consummating payment transactions, but in aspects related to CVM the mobile payment cardlets 304 may include program instructions that cause then to function, in accordance with aspects of the present invention, in a manner described below in connection with FIGS. 4A and 4B.

Further, in accordance with aspects of the present invention, a shared CVM applet (software application program) 308 is stored on the secure element 228 and provides CVM services for the mobile payment cardlets 304. Intercommunication between the shared CVM applet 308 on one hand and the mobile payment cardlets 304 on the other hand is indicated at 310 in FIG. 3. Further aspects of the shared CVM applet 308 will be described below, especially in connection with FIGS. 4A and 4B.

It will be appreciated that the mobile payment cardlets 304 and the shared CVM applet 308 are software applications or applets and thus may be referred to as software entities.

Another software entity that runs in the smartphone 102 (e.g., on the main control circuitry 202—FIG. 2—or possibly on non-secure portions of the NFC circuitry 224), is a wallet midlet 312 (FIG. 3). The term "midlet" is known to those who are skilled in the art, and may refer to a software application program that uses the mobile information device profile (MIDP) for Java ME (micro edition). However, in other embodiments, the functions of the wallet midlet, as described herein, may be implemented in another type of application program or applet, so that the term "midlet" should not be considering to be limited to MIDP applets.

The wallet midlet 312 may in some respects function in conventional ways, such as facilitating and managing the user's selection of one of the mobile payment cardlets 304 for a particular payment transaction. However, in accordance with aspects of the present invention, the wallet midlet 312 may also perform functions related to CVM in a manner to be described below in connection with FIGS. 4A and 4B. Intercommunication between the wallet midlet 312 on one hand and the mobile payment cardlets 304 on the other hand is indicated at 314 in FIG. 3.

Still another software entity that may run in the smartphone 102 (e.g., on the main control circuitry 202—FIG. 2—or possibly on non-secure portions of the NFC circuitry 224), is a CVM capture software module 316. In part the CVM capture software module 316 may function in a conventional manner to facilitate the capture and receipt by the smartphone 102 of CVM information provided by the user 306. In other respects, the CVM capture software module 316 may include program instructions that cause it to function in accordance with aspects of the present invention, as described below in connection with FIGS. 4A and 4B. As will be seen, the CVM capture software module 316 exchanges communications with the wallet midlet 312, as indicated at 318, and also exchanges communications with the shared CVM applet 308, as indicated at 320.

Block 322 in FIG. 3 represents the touchscreen 212 shown in FIG. 2 together with the driver software that enables other software entities to display information on the touchscreen 212 and to receive user input entered via the touchscreen 212. Both the touchscreen and the driver software therefor may be essentially conventional in their operations. Intercommunication between the touchscreen/driver block 322 and the wallet midlet 312 is indicated at 324; intercommunication between the touchscreen/driver block 322 and the CVM capture software module 316 is indicated at 326.

Indicated in phantom in FIG. 3 at 328 is a biometric unit that may be incorporated in some embodiments of the smartphone 102 in cases where the types of cardholder verification methods to be supported by the shared CVM applet 308 are to include biometric measures such as fingerprint reading, facial recognition, voice recognition, etc. It will be appreciated that in the case of at least some of these measures, the biometric unit 328 may be at least partially constituted by conventional features of the smartphone 102, such as the microphone 220 (FIG. 2) or a digital camera (not shown). It will be appreciated that the microphone 220 may serve as an input device to receive voice signals from the user as an input to a voice recognition CVM procedure; the camera, if present, may serve as an input device to generate image input signals for a "selfie" (photograph of the user's face) as an input to a facial recognition CVM procedure. Biometric information received by the smartphone 102 via the biometric unit 328 may be provided to the CVM capture software module 316, as indicated at 330.

A block labeled 104, 106 in FIG. 3 represents the proximity reader component 104 and the POS terminal 106 that were mentioned above in connection with FIG. 1. It is assumed for purposes of FIG. 3 (and also the ensuing discussion of FIGS. 4A and 4B) that the smartphone 102 is presented to the reader/POS terminal 104, 106 so that communication indicated at 332 (FIG. 3) can occur. The communication indicated at 332 may be such as conventionally occurs in a contactless payment transaction, and may allow one of the mobile payment cardlets 304 to upload to the POS terminal 106 the payment card account number and other information that corresponds to the mobile payment cardlet 304 in question.

Figure 4A:
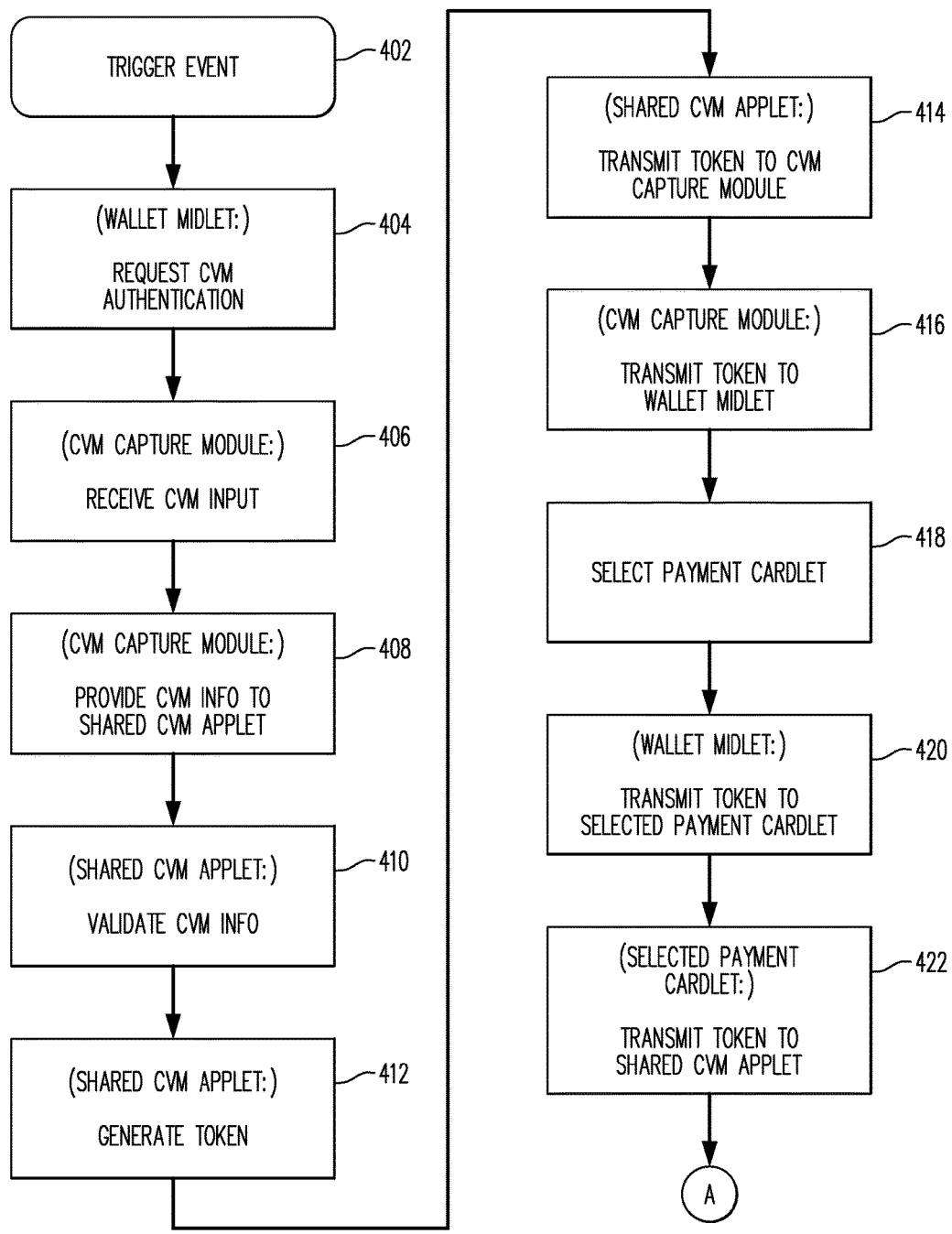
FIGS. 4A and 4B together form a flow chart that illustrates a process that may be performed in the smartphone of FIG. 2 according to aspects of the present invention.
Figure 4B:
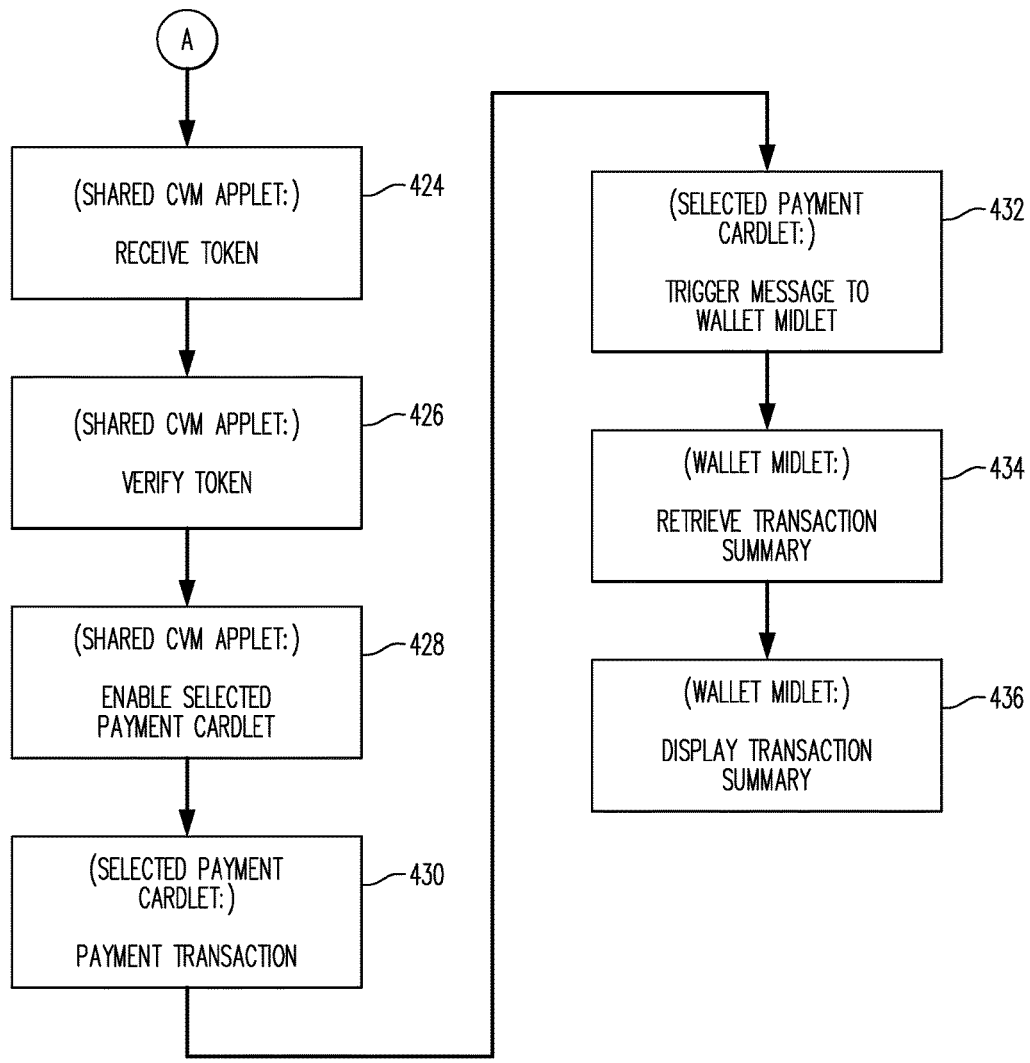

FIGS. 4A and 4B together form a flow chart that illustrates a process that may be performed in the smartphone 102 according to aspects of the present invention.

The process of FIGS. 4A and 4B is commenced by a trigger event indicated by block 402 in FIG. 4A. For example, a trigger event may occur if the smartphone 102 is tapped on the proximity reader component 104 for a payment transaction in which a CVM requirement is in effect. (For example, such as a payment transaction which exceeds the CVM required threshold of $50.00.)

In response to the trigger event, block 404 follows. At block 404, the wallet midlet 312 sends a communication to the CVM capture software module 316 to request execution of CVM authentication. Next, at 406, the CVM capture software module 316, acting through the touchscreen/driver block 322, receives CVM (cardholder verification) information provided by the user 306. For example, this may occur by the user 306 interacting with the touchscreen 212 (FIG. 2) to enter his/her PIN in response to a prompt displayed on the touchscreen 212.

Then, at 408, the CVM capture software module 316 may transmit the CVM information it received to the shared CVM applet 308. At 410, the shared CVM applet 308 may confirm the validity of the CVM information as entered by the user 306, by, for example, comparing it with the correct PIN as stored by the shared CVM applet 308. (In a case where the required CVM is a biometric measure such as voice recognition, the shared CVM applet 308 may store, e.g., biometric parameters so that it can validate raw biometric information input into the smartphone 102 by the user 306.)

In response to validating the CVM information, the shared CVM applet 308 may generate a CVM token, as indicated by block 412 in FIG. 4A. While in some embodiments, the CVM token may be simply an unpredictable number that the shared CVM applet 308 generates. (As used herein and in the appended claims, the term "unpredictable number" refers to a number generated in accordance with the well known EMV standard process for generating such a number.) Alternatively, the CVM token may be a cryptogram generated by the shared CVM applet 308 by using a private cryptographic key that is stored by or accessible to the shared CVM applet 308. In some embodiments, if a private cryptographic key is used by the shared CVM applet 308, the key need not be stored by or known to any other software entity within the smartphone 102, nor by any device outside of the smartphone 102, because—as will be seen—only the shared CVM applet 308 itself will be called upon to verify the cryptogram. The shared CVM applet 308 may use as the CVM token another type of number or character string, such as a number generated by a pseudorandom number generator.

In some embodiments, in addition to containing an unpredictable number or cryptogram or other information suitable for future verification by the shared CVM applet 308, the CVM token may also include in cleartext an indication of what sort of CVM information was supplied to and validated by the shared CVM applet 308.

At 414, the shared CVM applet 308 transmits the token it generated at 412 to the CVM capture software module 316.

At 416, the CVM capture software module 316 transmits to the wallet midlet 312 the token that the CVM capture software module received at 414.

At 418, a particular one of the mobile payment cardlets 304 is selected for use in the current payment transaction. The process of block 418 in itself may take place in a substantially conventional manner and may include, for example, the user 306 interacting with the wallet midlet 312 via the touchscreen driver block 322 to indicate which payment card account the user 306 wishes to use for the current payment transaction. In some embodiments, for example, the wallet midlet 312 may display images of several different payment cards on the touchscreen 212, and the user 306 may touch one of the images to signal the user's selection of the corresponding mobile payment cardlet 304.

At 420, the wallet midlet 312 transmits the token that it received at 416 to the selected mobile payment cardlet (assumed in this case to be mobile payment cardlet 304-1). This may occur, for example, by the wallet midlet addressing a message including the token to the AID (application identifier) that corresponds to the selected mobile payment cardlet, assumed in this case to be the cardlet 304-1.

At 422, the mobile payment cardlet 304-1 transmits the CVM token it received at 420 to the shared CVM applet 308. (Alternatively, in embodiments where the CVM token contains an indication in cleartext of what sort of CVM information the shared CVM applet 308 validated, the selected mobile payment cardlet 304-1 may reject the CVM token and abort the proposed transaction if the indicated sort of CVM information does not match the expectations of the selected mobile payment cardlet 304-1.)

Referring now to FIG. 4B, the process continues at 424. At 424, the shared CVM applet 308 receives the CVM token which was sent to it at 422 by the mobile payment cardlet 304-1 (and which the shared CVM applet 308 had originally issued at 412). Thus, after being generated by the shared CVM applet 308, the CVM token is passed to the CVM capture software module 316, then to the wallet midlet 312, then to the selected mobile payment cardlet (assumed to be 304-1) and then back to the shared CVM applet 308 from the selected mobile payment cardlet.

Following block 424 is block 426. At block 426, the shared CVM applet 308 verifies the CVM token as received from the selected mobile payment cardlet 304-1. If the CVM token was a cryptogram, the verification process undertaken by the shared CVM applet 308 may involve decrypting the CVM token using a private cryptographic key stored by or accessible to the shared CVM applet 308. If the CVM token was an unpredictable number originally generated by the shared CVM applet 308, then the shared CVM applet 308 may simply confirm that the CVM token passed to it by the selected mobile payment cardlet 304-1 matches the unpredictable number as generated by the shared CVM applet 308 in issuing the CVM token.

In some embodiments, the shared CVM applet 308 may at this point perform other checks with respect to the CVM token, in addition to verifying that the CVM token was originally issued by the shared CVM applet 308. For example, when the CVM token was intended for only a single use, the shared CVM applet 308 may check that the CVM token was not previously used (i.e., not previously submitted to the shared CVM applet 308 by one of the mobile payment cardlets 304). For this purpose, the shared CVM applet 304 may store information that indicates that at least some CVM tokens it issues are intended for only one use. In addition or alternatively, the shared CVM applet 304 may store information that records the status of at least some CVM tokens that it issues, where the status may be, for example, "issued, not consumed" or "issued, consumed". Those who are skilled in the art will recognize that other techniques may be employed by the shared CVM applet 308 to assure that at least some of the CVM tokens it issues are used only once.

As another example, let it now be assumed that CVM tokens may be reused, but only for a limited number of transactions (e.g., five transactions). To enable such a feature, the shared CVM applet 308 may maintain a counter for each reusable CVM token it issues; when the shared CVM applet 308 receives a reusable CVM token from the selected mobile payment cardlet 304, the shared CVM applet 308 may check the counter for the CVM token it received to confirm that the number of permitted uses of the CVM token has not been exceeded. If the number of permitted uses has not been exceeded, then the shared CVM applet 308 may increment the counter for that particular CVM token and allow the transaction to proceed, assuming that the shared CVM applet 308 also determined that the CVM token is authentic. It will be appreciated that the counter referred to above, or other suitable information stored/maintained by the shared CVM applet 308, may be considered information that indicates a remaining number of transactions for which the CVM token is authorized to be used.

As still another example, the following discussion will assume that CVM tokens may be valid for only a limited period of time. (According to various embodiments the limited-time CVM tokens may be one-use-only or may be usable for a predetermined number of times or for an unlimited number of times, in both cases up to the predetermined time limit.) To enable a time limit for at least some CVM tokens that it issues, the shared CVM applet 308 may record a time at which it issues each CVM token that is to be time-limited. When the shared CVM applet 308 later receives the CVM token back from a mobile payment cardlet 304 (and assuming the shared CVM applet 308 determines that the CVM token it receives is authentic), the CVM may check the current time (time of receipt by it of the CVM token) against the time of issuance of the CVM token to confirm that the predetermined time limit for use of the CVM token has not been exceeded. From previous discussion it will also be appreciated that in addition to confirming that the time limit has not been exceeded, the shared CVM applet 308 may in some embodiments, and/or in some cases, also confirm that the permitted number of uses for the CVM token has not been exceeded, or that the CVM token has not previously been used. From the foregoing, it will be understood that the shared CVM applet 308 may store information (such as time of issue) for one or more tokens that is indicative of a time at which the token expires.

Assuming that the shared CVM applet 308 succeeds at 426 in verifying the CVM token it received from the mobile payment cardlet 304-1, and further assuming that any other required check, such as those described above, also had a favorable result, then block 428 follows block 426. At block 428 the shared CVM applet 308 may allow that transaction to go forward by enabling the selected mobile payment cardlet 304-1 to proceed with the transaction. One way this may occur, for example, is that the shared CVM applet 308 may set the PVS (PIN verification status) flag to a "true" value for the selected mobile payment cardlet 304-1. In other embodiments, other techniques may be used to enable the selected mobile payment cardlet 304-1, such as the shared CVM applet 308 sending a "token confirmed" message to the selected mobile payment cardlet 304-1.

Block 430 then follows block 428. At block 430, the selected mobile payment cardlet 304-1 proceeds to perform the current payment transaction. For example, the selected mobile payment cardlet 304-1 may exchange communications with the POS terminal 106 in a conventional manner for carrying out a contactless payment transaction. As is well known, this may include the selected mobile payment cardlet 304-1 transmitting to the POS terminal 106 the payment card account number and other related information associated with the mobile payment cardlet in question.

Block 432 may follow block 430. At block 432 the selected mobile payment cardlet 304-1, having completed the payment transaction, may in a conventional manner send a trigger message to the wallet midlet 312 to inform the wallet midlet 312 that the payment transaction has been performed. This trigger message may, in accordance with known techniques, involve the selected mobile payment cardlet 304-1 raising an HCI (Host Controller Interface) event to the wallet midlet 312.

Next, at block 434, and in response to the trigger event initiated at 432, the wallet midlet 312 may in a conventional manner retrieve information that summarizes the payment transaction that was just completed. Further, at block 436, the wallet midlet 312 may in a conventional manner cause the transaction summary information to be displayed to the user 306 via the touchscreen 212 of the smartphone 102.

To briefly summarize some features of the above discussion, the software architecture on the smartphone secure element includes a shared CVM applet that, in response to validating CVM information, issues a CVM token that it later receives from a mobile payment cardlet and verifies. One advantage of this software architecture relative to previous arrangements is enhanced flexibility. For example, this software architecture readily facilitates changes in the required CVM input, such as upgrading from PIN entry to biometric verification (or adding biometric verification to PIN entry), without in any way requiring changes in the mobile payment cardlets. Thus upgrading of CVM requirements is decoupled from provisioning of mobile payment cardlets.

The software architecture described herein may also support multiple and/or time-limited authorizations of transactions based on a single successful CVM validation, by assigning expiration times and/or multiple-use-limits to the CVM tokens issued by the shared CVM applet.

The software architecture taught in this disclosure may further support flexibility in terms of which mobile payment cardlets are supported/serviced by a particular shared CVM applet. In this regard, reference will now be made to FIG. 5.

Figure 5:
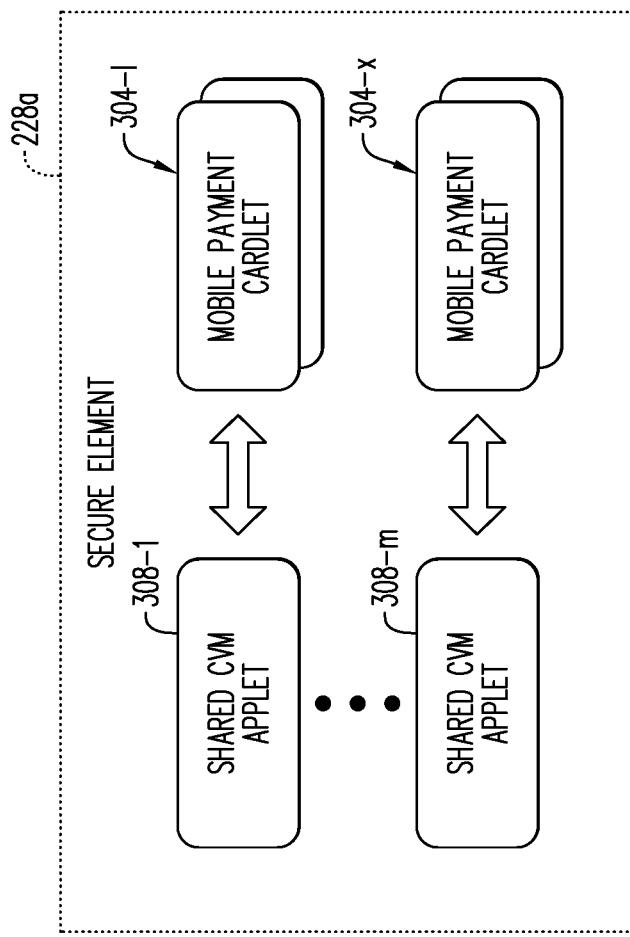
FIG. 5 is a diagram that illustrates an alternative arrangement of software aspects of the smartphone of FIG. 2 according to aspects of the present invention.

FIG. 5 is a diagram that illustrates an alternative arrangement of software aspects of the smartphone 102 according to aspects of the present invention. In particular, FIG. 5 shows an alternative software architecture for the secure element, indicated by reference character 228a in FIG. 5. In the architecture illustrated in FIG. 5, the secure element 228a stores a number of shared CVM applets 308-1 through 308-m. The shared CVM applets shown in FIG. 5 may be similar in operation to the shared CVM applet 308 represented in FIG. 3 and as described above in terms of its operations in connection with FIGS. 4A and 4B. Each of the shared CVM applets 308-1 through 308-m may serve a separate group of mobile payment cardlets. The two groups 304-I and 304-X of mobile payment cardlets shown in FIG. 5 are associated with and served by the shared CVM applets 308-1 and 308-m respectively. That is, CVM validation for all of the mobile payment cardlets in group 304-I is performed by the shared CVM applet associated therewith, namely shared CVM applet 308-1; and CVM validation for all of the mobile payment cardlets in group 304-X is performed by the shared CVM applet associated therewith, namely shared CVM applet 308-m. Each of the groups of mobile payment cardlets may include a number of such cardlets. Although only two such groups are shown in FIG. 5, in some embodiments there may be more than two such groups of mobile payment cardlets, and each may have associated therewith a respective shared CVM applet from among the applets 308-1 through 308-m.

To provide additional background, the architecture of FIG. 5 may be advantageously employed, for example, by allowing a number of different payment card account issuers (or other types of service providers) to each define and/or configure its own shared CVM applet, to serve various different mobile payment cardlets or other applets issued by the same issuer or service provider. Thus, for example, all of the cardlets in group 304-I may correspond to respective payment card accounts issued by Bank A, which also defined the shared CVM applet 308-1 to serve the mobile payment cardlets of group 304-I. Similarly, all of the cardlets in group 304-X may correspond to respective payment card accounts issued by Bank B, which also defined the shared CVM applet 308-m to serve the mobile payment cardlets of group 304-X. For example, this arrangement may provide added flexibility in that Bank A may require a first type of CVM, while Bank B may require a second and different type of CVM. For example, Bank A's required CVM may be PIN entry, while Bank B may require a biometric measure such as voice recognition as the CVM for the cardlets in group 304-X.

Thus, with the architecture of FIG. 5, there may be a considerable number of mobile payment cardlets operational on the secure element 228a, and the universe of mobile payment cardlets on the secure element may effectively be divided into subsets (corresponding to the groups of cardlets discussed above) with each of the subsets of cardlets submitting CVM tokens for verification by a respective one of a number of shared CVM applets that are operational on the secure element. As noted above, each of the shared CVM applets potentially may support a different CVM from the others.

Up to this point, aspects of the present invention have been described in the context of a payment system, and the transaction software entities served in common by a shared cardholder verification entity have been described as mobile payment cardlets. However, the teachings of the present disclosure are also applicable to uses of the smartphone as a credential for purposes other than payment. For example, instead of or in addition to the mobile payment cardlets described above, the smartphone secure element 228 may also store and run a number of applets that may serve as access credentials to permit the user to obtain access to electronically locked enclosures such as buildings, rooms, apartments, office suites, safes, safety deposit boxes, storage facilities, etc. Each occasion on which one of the access credential applets allows the user to access an enclosure may be considered to be an access transaction, and the access credential applets may be considered to be access transaction applets. As with the mobile payment cardlets, two or more of the access transaction applets may be served by a single applet, analogous to the shared CVM applet described above, for the purpose of verifying user identification information provided by the user. The shared user information verification applet for the access transaction applets may be considered to be a cardholder verification applet, like the shared CVM applet 308 described herein, and in the sense that the smartphone user may be considered a "cardholder" with respect to the access transaction credentials stored on the smartphone secure element, just as the user is deemed a cardholder with respect to the payment credentials represented by the mobile payment cardlets referred to herein.

Moreover, further transaction applets may be provided on the secure element to perform other credentialing functions, such as verifying the smartphone user's identity to a human attendant or guard, obtaining access to computer-operated facilities or computer hardware or software systems, or indeed weapons systems or any other type of resource for which access may be controlled by a machine-readable card or the like. As with the mobile payment cardlets discussed above, two or more of such access transaction and/or credentialing applets may be served by a shared cardholder verification applet. For example, transaction applets of mixed types may share a given cardholder verification applet. Thus, a shared CVM applet for one or more mobile payment applets may also serve to verify cardholder verification information for and to selectively enable one or more access transaction applets. Furthermore, and by analogy to the architecture of FIG. 5, the secure element in the smartphone 102 may store and run one shared CVM applet to serve a number of mobile payment cardlets, and may also store and run another shared applet that provides cardholder verification for a number of access transaction applets.

Aspects of the invention have been described above in the context of a smartphone. However, the principles of the present invention are equally applicable to other types of mobile devices, including tablet computers.

In embodiments described above, the shared CVM applet 308 has been assumed to contain or have access to a record of the relevant PIN information and/or biometric information against which to compare the CVM input from the user. However, in some embodiments, the storage of such information need not be local (where "local" may mean, stored in the secure element 228 and immediately accessible by the shared CVM applet 308). As one possible alternative, for example, the relevant PIN information and/or biometric information may be stored remotely on a host computer. In such a case, the shared CVM applet 308, via the smartphone 102 (e.g., via the smartphone operating system), may transmit the user CVM input (or parameters derived therefrom) by a secure channel to the remote host to obtain from the remote host confirmation that the user CVM input is valid. When it is said that the shared CVM applet 308 "validates" CVM information, this term should be understood to include the shared CVM applet 308 sending the CVM information to a remote host and receiving back confirmation of validation of the CVM information from the remote host.

In embodiments described above, it has been assumed that the required CVM information to be provided by the user was in the nature of a PIN and/or a biometric measure. However, in addition or alternatively, the required CVM information may include bringing another device (such as a contactless smartcard—not shown) into proximity with the smartphone 102 so that the smartphone 102 can seek to validate the CVM through the other device on behalf of the shared CVM applet 308.

In an example process described above (particularly block 402, FIG. 4A), the CVM procedure was launched in response to a "first tap" (of the smartphone 102 on the proximity reader 104) for a proposed transaction. However, it may be the case that the CVM procedure could be launched in response to other events, such as the user signaling via input to the smartphone 102 that the user desires to open the wallet midlet 312. In such a situation, one of the mobile payment cardlets 304 may be designated to pass the CVM token from the wallet midlet 312 to the shared CVM applet 308, even though the mobile payment cardlet in question has not currently been selected for a transaction (and indeed even though it is possible that no transaction is currently contemplated). In such a case, the mobile payment cardlet in question could report back to the wallet midlet 312 that the shared CVM applet 308 has verified the token and that the wallet midlet 312 accordingly should open. Alternatively, in such a situation, the wallet midlet 312 itself may submit the CVM token to the shared CVM applet 308 for verification.

In another situation, the CVM procedure may be launched by another action by the user, such as in a case where the user wishes to have the CVM procedure completed shortly in advance of the user proffering the smartphone to perform a payment transaction at a POS terminal.

In some embodiments, the CVM capture software module 316 and the wallet midlet 312 may be combined and/or the shared CVM applet 308 may issue the CVM token directly to the wallet midlet 312 rather than via the CVM capture software module 316. However, it may be the case that the architecture as described above in connection with FIGS. 3, 4A and 4B is preferable in the interest of keeping the wallet midlet 312 itself relatively simple. Whether the CVM token reaches the wallet midlet 312 directly from the shared CVM applet 308, or the CVM token is transmitted to the wallet midlet 312 via the CVM capture software module 316, in both cases the shared CVM applet 308 should be deemed to have transmitted the CVM token to the wallet midlet 312.

In some embodiments, one of the mobile payment cardlets 304 may incorporate the functionality of the shared CVM applet 308. In other words, in such embodiments the shared CVM applet 308 may be combined with one of the mobile payment cardlets 304.

It was noted above that in some embodiments the CVM token may contain information in addition to the unpredictable number/cryptogram or the like. In some embodiments, such additional information may be in a form that is readable outside the shared CVM applet 308 but not modifiable outside of the shared CVM applet 308. Such additional information may, for example, indicate what CVM technology (PIN, biometric, etc.) was employed and/or any limitations on use of the token (e.g., time restrictions, number of use restrictions, etc.). In some embodiments, restrictions on use of the token may be enforced at the transaction applet (cardlet) instead of or in addition to being enforced at the shared CVM applet 308.

In embodiments described herein, the transaction applets serviced by the shared CVM applet 308 are shown as being housed in a secure element. However, in other embodiments, some or all of the transaction applets may be located outside of the secure element.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

The flow charts and descriptions thereof herein should not be understood to prescribe a fixed order of performing the method steps described therein. Rather the method steps may be performed in any order that is practicable.

As used herein and in the appended claims, the term "payment card system account" includes a credit card account or a deposit account that the account holder may access using a debit card. The terms "payment card system account" and "payment card account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card or a debit card.

As used herein and in the appended claims, the term "payment card system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
issuing a user verification token from a CVM applet running in a secure element in a mobile device;
receiving the issued user verification token in a wallet midlet running in the mobile device;
selecting a payment card applet from among a plurality of payment card applets stored in the secure element; and
transmitting the received issued user verification token from the wallet midlet to the selected payment card applet.

2. The method of claim 1, wherein the wallet midlet receives the user verification token from the CVM applet.

3. The method of claim 1, wherein the wallet midlet receives the user verification token from a CVM software capture module.

4. The method of claim 3, wherein the CVM software capture module runs in the mobile device outside of the secure element.

5. The method of claim 4, wherein the wallet midlet runs in the mobile device outside of the secure element.

6. A method comprising:
issuing a user verification token from a CVM applet running in a secure element in a mobile device;
receiving the issued user verification token by the CVM applet from a payment card applet;
verifying the received user verification token by the CVM applet; and
in response to a result of the verifying step, enabling the payment card applet by setting a PIN verification status flag for the payment card applet to a "true" value.

7. The method of claim 6, wherein said payment card applet is a first payment card applet;
the method further comprising:
prior to the receiving step, selecting the first payment card applet from among a plurality of payment card applets stored in the secure element.

8. The method of claim 7, further comprising:
after the selecting step, transmitting the issued user verification token from a wallet midlet to the selected payment card applet.

9. The method of claim 8, wherein the wallet midlet runs in the mobile device but not in the secure element.

10. The method of claim 9, further comprising:
transmitting the issued user verification token from the CVM applet to the wallet midlet.

11. The method of claim 9, further comprising:
receiving the issued user verification token in the wallet midlet from a CVM capture software module.

12. The method of claim 11, further comprising:
transmitting the issued user verification token from the CVM applet to the CVM capture software module.

13. The method of claim 6, wherein said enabling step is performed by the CVM applet.

14. A method comprising:
receiving user verification data in a mobile device;
providing the received user verification data to a verification software entity in the mobile device;
validating the user verification data by the verification software entity;
generating a token by the verification software entity in response to the validating of the user verification data;
receiving the generated token in a wallet midlet in the mobile device;
receiving a request to open the wallet midlet;
in response to receiving said request, transmitting the token from the wallet midlet to a payment applet in the mobile device;
transmitting the token from the payment applet to the verification software entity;
verifying, by the verification software entity, the token received by the verification software entity from the payment applet;
receiving, by the wallet applet, from the payment applet, an indication that the verification software entity has verified the token;
in response to the received indication, opening the wallet midlet for interaction with a user of the mobile device.

15. The method of claim 14, wherein the request to open the wallet midlet is received prior to receiving the user verification data.

16. The method of claim 15, wherein the payment applet runs in a secure element in the mobile device.

17. The method of claim 16, wherein the wallet midlet does not run in said secure element.

18. The method of claim 14, wherein the token is valid for one use only.

19. The method of claim 14, wherein the mobile device is a smartphone.

20. The method of claim 14, wherein the payment applet is associated with a payment account owned by a user of the mobile device.

* * * * *